United States Patent Office.

ADOLF KAYSER, OF BUFFALO, NEW YORK, ASSIGNOR OF TWO-THIRDS TO ALBERT B. YOUNG AND HORACE WILLIAMS, BOTH OF SAME PLACE.

PROCESS OF MAKING SODIUM CARBONATE.

SPECIFICATION forming part of Letters Patent No. 320,256, dated June 16, 1885.

Application filed April 9, 1884. (No specimens.)

*To all whom it may concern:*

Be it known that I, ADOLF KAYSER, of the city of Buffalo, in the county of Erie and State of New York, have invented a new and useful Improvement in the Method of Manufacturing Carbonate of Soda, of which the following is a specification.

This invention relates to an improvement in the method of manufacturing carbonate of soda or soda-ash from common salt, and has for its object to produce the carbonate of soda in a simple, more convenient, and less expensive manner than heretofore, as will be hereinafter fully described, and pointed out in the claims.

My invention is based upon the discovery that sulphate of soda when exposed at a low red heat to a current of carbon-monoxide in the presence of a sufficient volume of carbonic-acid gas is decomposed and converted into carbonate of soda, while the sulphur is driven off in the form of sulphurous acid.

In practising my invention the sulphate of soda may be produced in any known or suitable manner; but I prefer to produce it by subjecting common salt in a battery of cast-iron cylinders to the action of sulphurous acid, according to the well-known Hargreaves method. These cylinders are connected by suitable gas-conduits, so that the sulphurous-acid gas derived from roasting pyrites or burning sulphur is passed successively through the several cylinders. The gas enters, first, the cylinder containing salt which is most nearly converted into sulphate of soda, and passes then successively through the several cylinders, the charge in each following cylinder containing a smaller proportion of sulphate of soda, until the last cylinder is reached, which contains fresh unconverted salt. The cylinder containing the finished sulphate of soda is disconnected from the battery through which the current of sulphurous-acid gas flows. All of this is old and well known. In the ordinary method of manufacturing carbonate of soda by the Le Blanc process the sulphate of soda is removed from the cylinder, when finished, and then converted into carbonate of soda by smelting the salt together with carbon and carbonate of lime, leaching out the soda, and evaporating the liquid, &c.

By the best method of practising my invention the sulphate of soda is not removed from the cylinder when finished; but a current of carbonic-acid gas and carbon-monoxide, one equivalent of each, is caused to flow through the cylinder containing the sulphate of soda, the latter being kept at a low red heat, below the smelting-point of both sulphate and carbonate of soda. The mixture of gases required for this process is readily generated by burning coal or other carbonaceous fuel free of hydrogen in a suitable furnace, either by a natural draft or a blast, the column of coal being kept so high that only carbon-monoxide is produced by the combustion taking place at the base of the column. A jet of air is admitted to the carbon-monoxide escaping from the fuel, and the quantity of air so admitted is so regulated that only a portion of the carbon-monoxide is burned and converted into carbonic acid, so that the gas escaping from the generating-furnace consists of a mixture of one equivalent of carbon-monoxide and one of carbonic acid.

The air blast or draft of the furnace and the air-jet admitted to the gas-conduit are controlled by suitable valves or dampers, so that the composition of the gas can be regulated by the operator.

Care should be taken that the proper portion of carbonic-acid gas is maintained, because when the gas mixture is deficient in carbonic acid sulphur is evaporated instead of sulphurous acid, and sodium sulphide is formed, which is fusible at a low temperature, and smelts and fills the pores of the salt under treatment, whereby the process of conversion is not only retarded, but the sulphide so formed and the unconverted sulphate inclosed by the fused sulphide represents so much lost material. I employ at least one equivalent of carbonic acid and one equivalent of monoxide of carbon to one equivalent of sulphate of soda; but a small excess of carbonic acid is desirable. The reaction taking place under this treatment may be represented by the following formulas: $Na_2SO_4 + CO_2 + CO = Na_2CO_3 + SO_2 + CO_2$. An excess of carbonic acid is less objectionable than an excess of carbon-monoxide, because the excess of carbonic acid operates, principally, as an unnecessary diluting agent, while an excess of carbon-monoxide defeats the object of the process altogether.

This gas mixture is drawn by a suitable exhaust-fan through the cylinder containing the sulphate of soda, and converts the sulphate of soda into carbonate of soda, sulphurous-acid gas being liberated and drawn off by the exhaust-pump, together with the nitrogen. The conversion is completed when the escaping gases show no trace of sulphurous acid.

The sulphurous-acid gas which is liberated in this process is conducted to the battery of cylinders in which the salt is converted into sulphate of soda and utilized for this conversion, together with the sulphurous-acid gas which is freshly generated, as above described, whereby a great saving in the required quantity of fresh sulphurous-acid gas is effected. The sulphur contained in the sulphate of soda is in this manner to a large extent used over, whereby the cost of the carbonate of soda is greatly reduced.

I am aware of the provisional British specification of A. E. Fletcher, No. 1,786 of 1873, in which it is proposed to convert sulphate of soda into sodium sulphide and the latter into carbonate of soda, and I do not claim such treatment, as it is impracticable and essentially different from my invention.

I am also aware that it is proposed in the same provisional specification to treat the sulphide of soda at an elevated temperature with such gases as may rise from the partial combustion of coal or other mixtures in such manner that hydrogen sulphide is driven off, and I do not here claim such a process, as it is essentially different from my process, in which sulphurous acid is driven off, which latter can be directly used for converting common salt into sulphate of soda. Furthermore, a process in which hydrogen sulphide is formed necessarily uses larger volumes of gases than my process.

I am also aware that various ways have been suggested of producing sodium carbonate directly by the oxides of carbon; but I am not aware that any of them have proved successful.

I claim as my invention—

1. The process herein described of converting sulphate of soda into carbonate of soda, (in contradistinction to converting sulphate of soda into sulphide of sodium,) which consists in heating the sulphate of soda in a suitable vessel to a low red heat below the smelting-point of the sulphate, and causing a current of carbonic-acid gas and carbon-monoxide, substantially one equivalent of each, to flow through the heated sulphate, forming carbonate of soda and sulphurous acid, substantially as set forth.

2. In the manufacture of carbonate of soda the process of converting common salt into carbonate of soda, which consists in converting sulphate of soda into carbonate of soda by heating the sulphate of soda in a suitable vessel to a low red heat below the smelting-point of the sulphate, and causing a current of carbonic-acid gas and carbon-monoxide, substantially one equivalent of each, to flow through the heated sulphate, forming carbonate of soda and sulphurous acid, and in employing the sulphurous-acid gas generated by this treatment for the conversion of common salt into sulphate of soda, substantially as set forth.

Signed the 4th day of April, 1884.

A. KAYSER.

Witnesses:
 EDWARD WILHELM,
 CARL F. GEYER.